Patented Aug. 9, 1938

2,126,445

UNITED STATES PATENT OFFICE 2,126,445

PREPARATION OF FOOD PRODUCTS FROM FISH SCRAP

Walter H. Boutilier, Halifax, Nova Scotia, Canada

No Drawing. Application August 23, 1935, Serial No. 37,503

4 Claims. (Cl. 99—112)

This invention relates to the preparation of a food product adapted to meet the needs of inhabitants of regions where, due to deficiencies in the soil, methods of preparing food or other causes, the available food is deficient in mineral constituents and iodine.

The food product provided in accordance with this invention consists of salts and other extractives obtained by subjecting fish scrap, such as bones, livers, kidneys and blood, to the action of an acid liquid characterized by a hydrogen ion concentration equal to a pH of between 3 and 5. This treatment serves to decrease the solubility of the protein content of the scrap while increasing the solubility of a number of the salt constituents and yields a solution containing a substantial amount of calcium ions and phosphate ions along with sodium ions, chloride ions, iron ions, copper ions, magnesium ions, manganese ions, and potassium ions. The solution is then filtered or decanted to free it from undissolved material, the resulting filtrate being then dried to provide a material consisting largely of salts extracted from the fish tissues but containing also small amounts of proteins and other extractives. The material is then ready for use and is substantially free of the odors characteristic of the fish scrap from which it is obtained.

The pH value of the acid liquid used in accordance with this invention is subject to considerable variation but the best results are obtained when the hydrogen ion concentration of the liquid is such as to give a pH of between 3 and 5. If the scrap is acidified by means of a volatile acid, such as acetic acid, the acid reaction of the filtrate obtained as above described is corrected and reduced sufficiently close to the neutral point by the evaporation which occurs during the drying period.

In place of acetic acid I may use any other acids capable, in aqueous solution, of giving a hydrogen ion concentration equal to a pH value of between 3 and 5. The use of acetic acid is preferred, however, since it enables the acid reaction of the filtrate to be corrected by the drying to which the filtrate is necessarily subjected as part of this invention.

The following is cited as a specific example of the invention as applied to the treatment of codfish scrap:

100 lbs. of the backbones of codfish are first scraped with a knife or scrubbed with a wire brush to remove as much as possible of the adhering flesh. The bones, after being ground to a particle size of about ¼", are placed in vessels containing vinegar. In practice it has been found that one gallon of vinegar is sufficient for the treatment of from 4 to 5 lbs. of fish bones. The bones are allowed to soak in the vinegar from 2 to 4 days in order to allow sufficient time for the salts (including the salts already in solution and those which are dissolved by the relatively high ion concentration of the acid liquid) to diffuse out of the tissues into the liquid. The solution containing the dissolved salts is then filtered through a double layer of cheese cloth and allowed to settle for a period of approximately 2 hours, after which it is again filtered or decanted in order to eliminate remaining undissolved material. The solution, which is now free from all fishy odors, is then placed on Pyrex glass dishes and allowed to dry in a suitable oven at a temperature between 70° and 80° C. During the drying operation the door of the oven is left partly open or a current of air is blown over the material being dried to prevent burning or scorching thereof. After being sufficiently dried the salts are ground or crushed to a suitable fineness and are then ready for use as a food product either alone or in admixture with a suitable quantity of kelp. The amount of kelp added to the salts is determined by the iodine content of the salts, the iodine content of the kelp and the iodine need of the persons by whom the salts are to be consumed. It is well known that the iodine need of the inhabitants in different regions vary greatly. For example, the inhabitants of Nova Scotia need practically no iodine whereas in Ontario, Canada, where the soil is deficient in iodine, the need is very great. Since the iodine content of the salts and kelp will not vary greatly from time to time it is possible, in accordance with this invention, to provide a food product in which the kelp and salts are proportioned to give an iodine content suitable to the inhabitants of any particular region. This invention also contemplates the recovery of mineral salts and other desirable extractives from the liver, kidneys and blood of fish as well as from the bones.

Having thus described my invention what I claim is:—

1. In the manufacture of a food product rich in mineral constituents the process which consists in subjecting fish scrap to the action of an aqueous solution of acetic acid characterized by a hydrogen ion concentration equal to a pH value of between 3 and 5, filtering the resulting solution to free it of undissolved material and then subjecting the filtrate to a temperature between 70 and 80° C. until the salts and other extractives contained therein are recovered in a sufficiently dry condition.

2. In the manufacture of a food product rich in mineral constituents the process which consists in soaking fish scrap for a period ranging from 2 to 4 days in an acid liquid characterized by a hydrogen ion concentration equal to a pH value of between 3 and 5, filtering the resulting solution and allowing it to settle for a period of approximately 2 hours after which it is again filtered to free it from any undissolved material still contained therein and then recovering salts and other extractives contained in the filtrate by subjecting the latter to an evaporating temperature between 70 and 80° C.

3. The method of obtaining a food product from fish scrap which comprises cleaning fish bones to remove as much as possible of the adhering flesh, grinding the bones to a particle size of about ¼", soaking the ground bones in vinegar for a period ranging from two to four days, filtering the resulting solution and allowing it to settle for a period of approximately two hours after which it is again filtered to free it from any undissolved material still contained therein, and then recovering salts and other extractives contained in the filtrate by subjecting the latter to an evaporating temperature between 70° and 80° C.

4. The herein described process which comprises cleaning 100 lbs. of the backbone of cod fish to remove as much as possible of the adhering flesh, grinding the bones to a particle size of about ¼", soaking the ground bones in about one gallon of vinegar for a period ranging from two to four days, filtering the resulting solution and allowing it to settle for a period of approximately two hours after which it is again filtered to free it from any undissolved material still contained therein and then recovering salts and other extractives contained in the filtrate by subjecting the latter to an evaporating temperature between 70° and 80° C.

WALTER H. BOUTILIER.